United States Patent [19]

Atwell

[11] Patent Number: 4,615,418

[45] Date of Patent: Oct. 7, 1986

[54] HYDRAULIC SAFETY BRAKE

[76] Inventor: William L. Atwell, 5328 Scottdale Rd., St. Joseph, Mich. 49085

[21] Appl. No.: 751,466

[22] Filed: Jul. 3, 1985

Related U.S. Application Data

[63] Continuation of Ser. No. 648,353, Sep. 7, 1984, abandoned, which is a continuation of Ser. No. 391,512, Jun. 24, 1982, abandoned.

[51] Int. Cl.$^4$ .............................................. F16D 65/24
[52] U.S. Cl. ................................. 188/170; 188/72.1; 188/71.5; 192/70.27; 192/91 A
[58] Field of Search ................... 188/170, 72.1, 71.5; 192/91 R, 91 A, 70.19, 70.27; 92/130 A

[56] References Cited

U.S. PATENT DOCUMENTS

| | | | |
|---|---|---|---|
| 1,558,773 | 10/1925 | Baits | 192/70.19 |
| 2,342,750 | 2/1944 | Newell | 188/170 X |
| 2,517,955 | 8/1950 | Zimmermann | 192/91 A X |
| 2,698,676 | 1/1955 | Easa | 188/170 |
| 2,709,926 | 6/1955 | Jandasek | 192/91 A X |
| 2,775,319 | 12/1956 | Friedman | 188/170 |
| 3,146,860 | 9/1964 | Wilson | 192/70.19 X |
| 3,195,692 | 7/1965 | Herr et al. | 188/170 |
| 3,536,230 | 10/1970 | Williams | 188/170 X |
| 3,599,760 | 8/1971 | Moss | 188/170 |
| 3,863,038 | 1/1975 | Kreitner et al. | 188/170 |
| 4,010,827 | 3/1977 | Ellis et al. | 188/71.2 |
| 4,128,145 | 12/1978 | Euler | 188/170 |
| 4,263,991 | 4/1981 | Morgan et al. | 188/170 |

FOREIGN PATENT DOCUMENTS 2453472 5/1976 Fed. Rep. of Germany ...... 188/170

Primary Examiner—George E. A. Halvosa
Attorney, Agent, or Firm—Willian Brinks Olds Hofer Gilson & Lione

[57] ABSTRACT

A safety brake unit for use in hydraulic or fluid power systems. The brake includes interleaved fixed and rotating discs held in compression by actuation pins and spring biased by a piston. As fluid pressure to the piston is relieved, the piston retracts to compress the discs and engage the brake.

4 Claims, 6 Drawing Figures

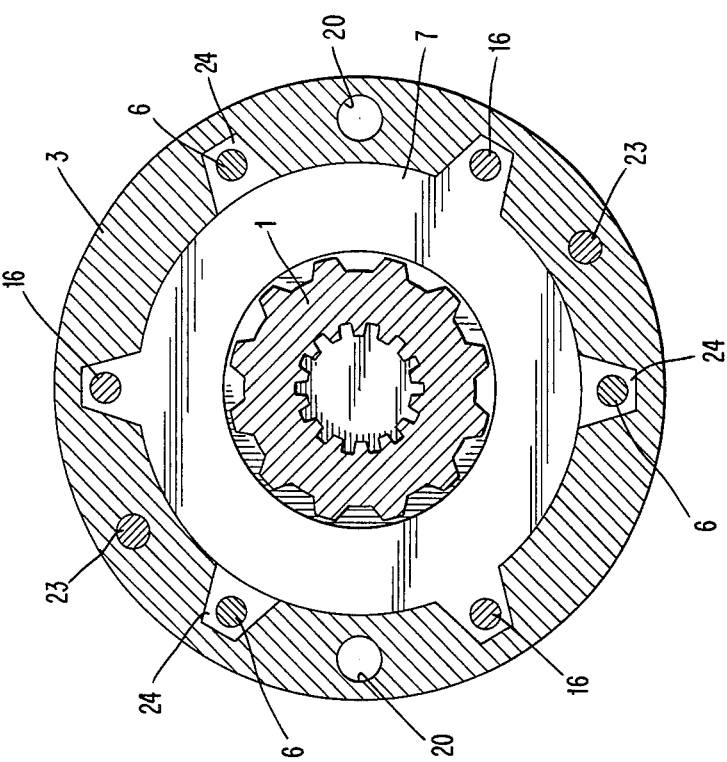
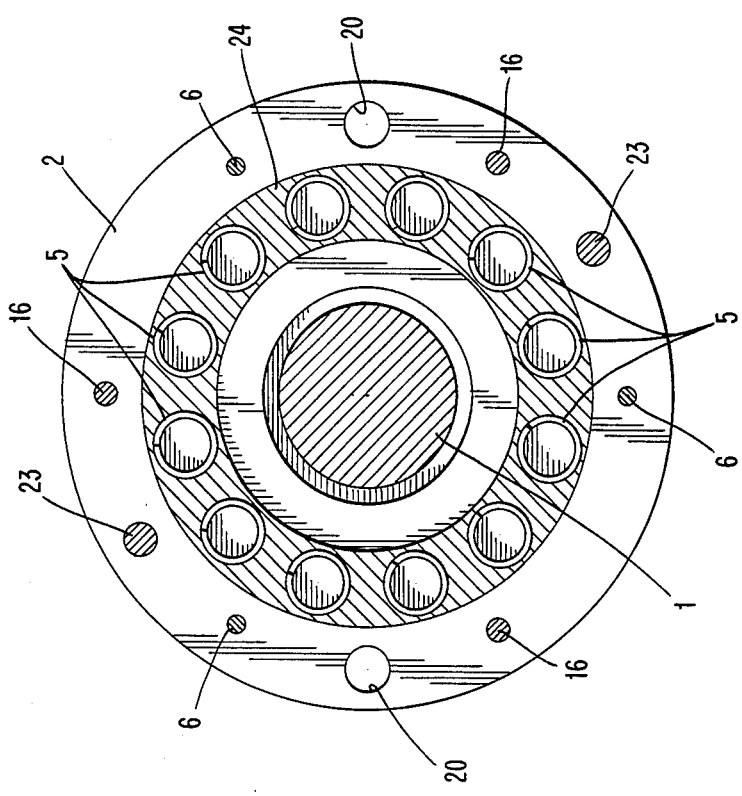

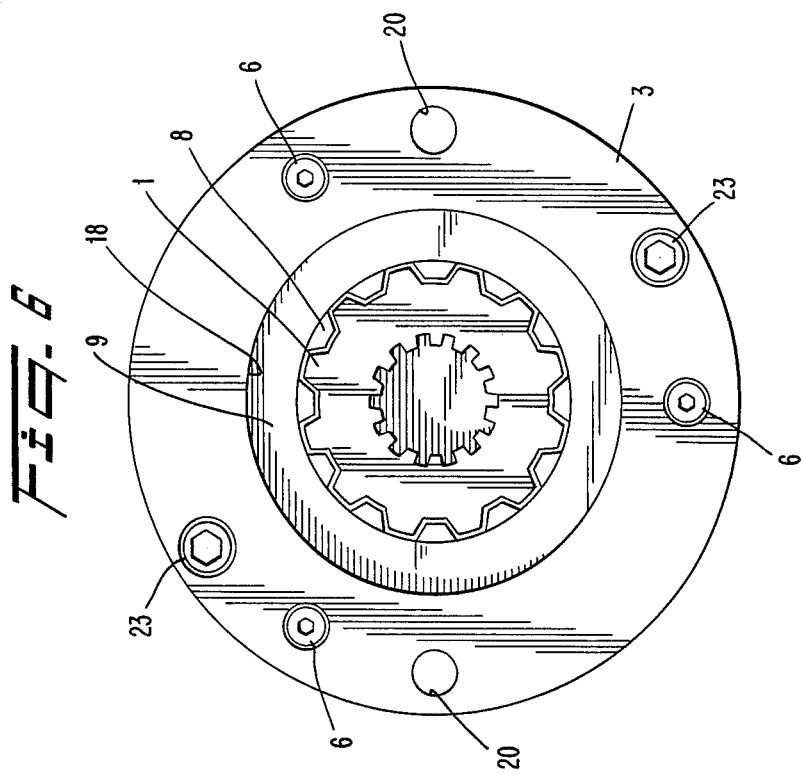
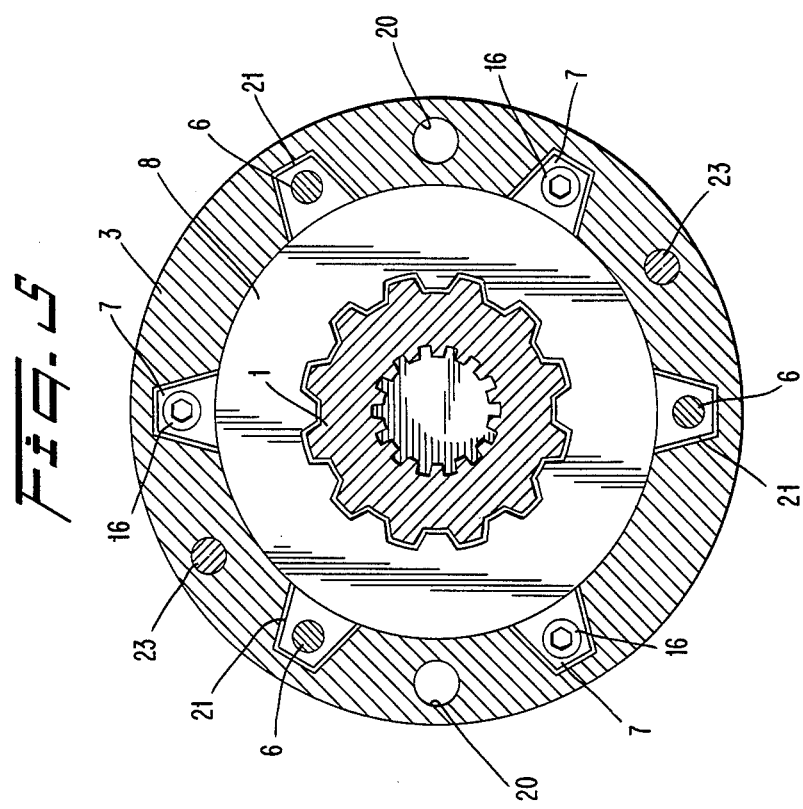

HYDRAULIC SAFETY BRAKE

This application is a continuation of Ser. No. 648,353, filed Sept. 7, 1984, which is a continuation of Ser. No. 391,512, filed June 24, 1982, both abandoned.

BACKGROUND OF THE INVENTION

This invention relates to improvements in brakes of the fail-safe design, i.e., hydraulically-released, spring-engaged disc brakes. These are used primarily in machines and vehicles which are using hydraulic or hydrostatic drive components.

Two of the inherent advantages for using hydraulic drive systems in machinery and vehicles give rise to the need for a brake which is hydraulically released and spring engaged. One is the fact that there is no requirement for a mechanical link between the hydraulically driven motor and the prime mover; instead, the power in a hydraulic drive system is transmitted through relatively vulnerable tubing or hose. Secondly, most hydraulic drive systems can eliminate the need for dynamic brakes because of a hydraulic motor's inherent ability to act as a brake when properly valved.

Thus a failure of a hydraulic component or power transmission lines will result in a vehicle or machine with no dynamic retarding force or emergency lock-up capabilities. Therefore, use of this invention is required in nearly all hydraulic applications for reasons of safety.

Two other characteristics of hydraulic drive systems weighed heavily in the development of this invention and these are:

1. hydraulic systems are by nature very compact for their very high power output;
2. hydraulic systems are modular in concept, i.e., each component is a standalone type of mechanism and a drive system is composed of these various components or modules.

OBJECTIVES

An objective of this invention is to provide a brake with spring engagement and hydraulic release thus providing a braking force in the event of a hydraulic failure.

The major objective of this invention is to provide a means of constructing such a brake as previously described which will allow a very high output torque in a package size previously unattainable in safety brake designs.

Another objective of this invention is to provide a brake which is modular in design, i.e., a safety brake which requires no housing to function. This allows the use of the brake in gear box housings and allows the addition of simple housings or casings to add various mounting configurations and various functions to the brake module.

Another objective of this invention is to eliminate piston lockup and breakage problems inherent with other fail-safe designs. This is accomplished by a balanced design which places all the main operating parts in tension.

Another advantage of this design is due to the placement of the engagement springs in the release piston. This allows the piston to be constructed in such a manner as to have greatly enhanced the structural strength without adding any extra length to the package configuration.

Another advantage of this invention is the fact that the function of the brake and release mechanism can be tested and inspected without the cover in place. This greatly enhances the quality control of this invention by allowing total visual inspection of the moving parts.

A further objective of this invention is to provide a brake design which allows the use of a sufficiently large radius shaft-rotor interface diameter so that enough space is provided for the addition of an inner shaft and sprag clutch for use as a hoist brake. Also, enough space is provided to allow the use of the safety brake in very large keyed shafts which are found in many machine designs.

The aforementioned objectives will be clarified and each one's value will become apparent in the detailed description that follows.

BRIEF DESCRIPTION OF THE FIGURES

FIG. 3 is a cross-sectional view taken along line 3—3 of FIG. 1.

FIG. 4 is a cross-sectional view taken along line 4—4 of FIG. 1.

FIG. 5 is a cross-sectional view taken along line 5—5 of FIG. 1.

FIG. 6 is an end view of the brake as seen from line 6—6 of FIG. 1.

While this invention is described in connection with a preferred embodiment, it is not the intention of the inventor to limit the invention to this embodiment. Rather, it is intended to cover all alternatives, modifications, and equivalents as may be included within the principles set forth describing this invention.

DETAILED DESCRIPTION

Figure 1:
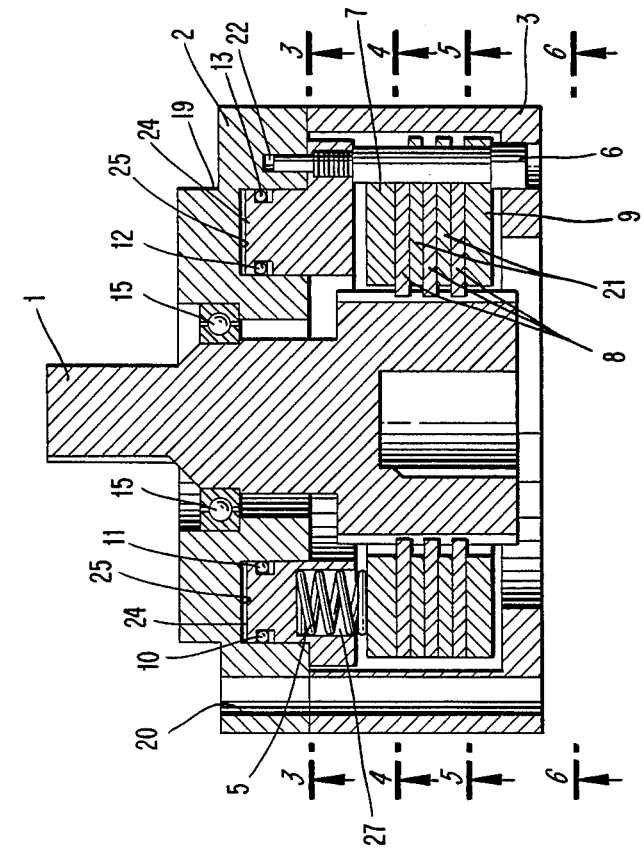
FIG. 1 is a sectional view of the brake of this invention.

The drawing in FIG. 1 depicts a cross-sectional view of the invention, a pressure-release, spring-engaged safety brake. The brake, as shown, can be configured in a number of ways. The most likely configuration is that of mounting the brake between a hydraulic motor (not shown) and a drive hub (not shown). In most circumstances, the housing of the motor or input device will be plugged into the cover plate, #3, which contains a pilot diameter, #18, which locates each concentric to the other. The input device's rotating shaft (not shown) will then engage the shaft, #1, by spline, key way, or other suitable means as to lock the two together. The brake is then plugged into the drive hub or gear box in the same manner as the input device to the brake. The brake uses the male pilot, #19, as a location reference and the shaft, #1, plugs into a suitable coupling on the drive hub. Thus, the couplings and shafts of the motor, brake, and drive hub act as one unit. The motor or input device is bolted to the drive hub via bolts (not shown) which pass through the brake in mounting holes, #20.

Figure 2:
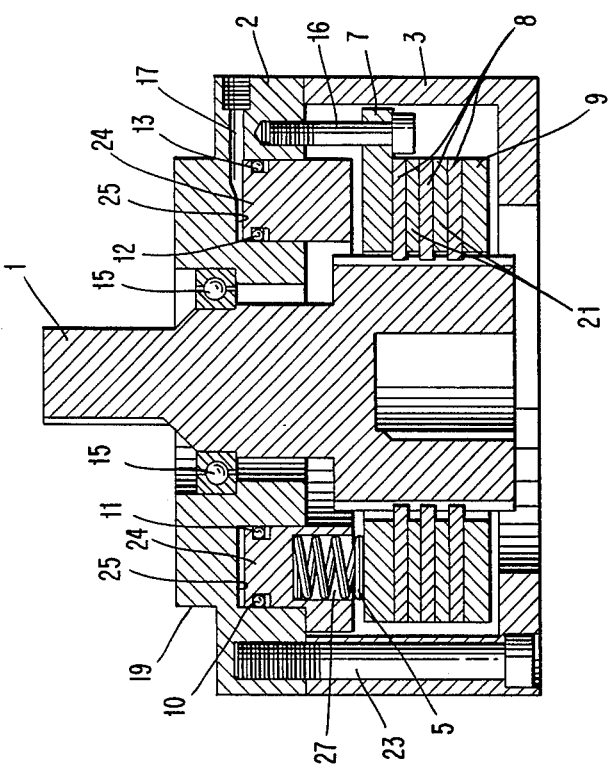
FIG. 2 is a second sectional view of the brake showing the tension pins.

The brake, as shown in FIG. 2, is comprised of a cover plate, #3, and a pressure plate, #2, which are secured together by assembly bolts, #23. These two parts form a compact case which encompasses all the moving parts and by means of a suitable case seal, #14, excludes foreign matter such as water, mud, etc. from entering the case.

The brake shaft, #1, is carried in a low-friction device such as a ball bearing, #15. This mounting configuration, utilizing only one anti-friction device, holds the shaft concentric to the pilot diameters thus making it possible to utilize a suitable radial lip oil seal (not shown) to seal the brake off from lubrication fluids used in the gear box or drive hub.

The exterior of the shaft, #1, and the interior diameter of the rotors, #8, carry a gear tooth configuration which allows the rotors, #8, to move freely relative to the shaft in an axial motion yet restricts any radial motion relative to the shaft.

Interleaved with the rotors, #8, are the stationary discs, #21, which are fixed radially yet free to move axially along the actuation pins, #6.

The actuation pins, #6, are located by pilot diameters, #22, in the pressure plate. This configuration allows the actuation pins to move axially but restricts all radial motion relative to the pressure plate, #2. The actuation pins perform two functions:

A. they transmit all torque generated by the compression of the interleaved disc stack, #7, #8, #9, and #21, to the outer case, #2 and #3, of the invention;

B. they transmit the spring force generated by the compression springs, #5, to the primary plate, #7.

Actuation pins #6 are shown in the retracted, braked position in FIG. 1. In this position spring force is applied to the disc pack #7, #8, #9 and #21, which restricts the radial motion of the rotors, #8, and thus the shaft, #1, effectively engaging the brake.

As shown in FIG. 1, springs #5 are housed within a groove #27 in piston #24. Spring force is generated by compressing the springs, #5, between the spring plate, #9, and the release piston, #24. This is accomplished by the use of tension pins, #16, which are affixed to the pressure plate, #2, a specific distance from the release piston, #24. The tension pins are located equally spaced around the perimeter of the spring plate to maintain balanced forces.

To release the brake fluid pressure is injected through the port, #17, in the pressure plate, #2. Thus, the fluids enter the annular piston groove, #25, in the pressure plate. The fluid is contained between the pressure plate and the piston by the use of suitable seals, #10, #11, #12, and #13. As the pressure in this chamber, #25, increases, the piston, #24, is forced out of the piston groove, #25, thus compressing the springs, #5, against the spring plate, #9.

FIG. 1 clearly shows the actuation pins, #6, affixed to the piston, #24. The consequence of this arrangement is the removal of the aforementioned spring force on the disc stack, #7, #8, #9, and #21, as the fluid pressure pushes the piston and the actuation pins axially. Due to the fixed position of spring plate #9, all spring forces are absorbed by the spring plate as the piston #24 is moved axially. This action in effect allows the disc stacks to move freely axially and removes the restriction of the rotors, #8, and shaft, #1, to move radially relative to the brake case, #2 and #3. As fluid pressure within chamber #25 decreases, the piston #24 is returned to the braked position shown in FIG. 1 by the obvious influence of springs #5. As piston #24 returns to this position, actuation pins #6 move axially with the piston compressing the disc stack and activating the brake.

I claim:

1. A disc brake comprising a stationary case, a shaft rotatably supported in said case, a disc stack in said case surrounding said shaft and including a plurality of interleaved rotatable and fixed discs, means connecting said rotatable discs for rotation with said shaft and allowing movement longitudinally of said shaft, a plurality of spaced actuation pins extending through said fixed discs and axially slidably supported at opposite ends by said case, said pins fixing said fixed discs against rotation relative to said case and allowing movement of said fixed discs longitudinally of said shaft, piston means in said case and fixed to said actuation pins, a spring plate between said piston means and said disc stack and operable to engage a disc at one end of said stack, spring means caged between said piston means and said spring plate, means connecting said spring plate to said case allowing movement of said spring plate in one direction relative to the case away from said disc stack and toward said piston, and limiting movement of said spring plate in the other direction away from said piston means, said actuation pins being operatively engagable with a disc at the other end of said stack and operable to limit movement of said stack away from said piston means, said piston means being movable in one direction causing movement of said actuation pins and pressing said interleaved discs together, movement of said piston means and said actuation pins in the other direction releasing said interleaved discs.

2. A disc brake as claims in claim 1, said case enclosing said piston means and said disc stack.

3. A disc brake as claimed in claim 1, further including a primary plate engaging the disc at the other end of said stack, said actuating pins abuttingly engaging said primary plate.

4. A disc brake as claimed in claim 1, said means connecting said spring plate to said case including a plurality of tension pins fixed at one end to said case and slidably extending through said spring plate, said tension pins abuttingly engaging said spring plate.

* * * * *